(12) United States Patent
Keesling et al.

(10) Patent No.: US 9,185,197 B2
(45) Date of Patent: Nov. 10, 2015

(54) ACCESSORY FOR MOBILE DEVICES (71) Applicant: Feinger, LLC, Anderson, IN (US)

(72) Inventors: Cole B. Keesling, Fishers, IN (US); Jason B. McCrocklin, Anderson, IN (US)

(73) Assignee: CoJam, LLC, Anderson, IN (US)

( * ) Notice: Subject to any disclaimer, the term of this patent is extended or adjusted under 35 U.S.C. 154(b) by 220 days.

(21) Appl. No.: 13/767,192

(22) Filed: Feb. 14, 2013

(65) Prior Publication Data

US 2013/0210503 A1    Aug. 15, 2013

Related U.S. Application Data (60) Provisional application No. 61/599,265, filed on Feb. 15, 2012.

(51) Int. Cl.
*H04M 1/02* (2006.01)
*H04B 1/3827* (2015.01)
*H04B 1/3877* (2015.01)
*H04B 1/3888* (2015.01)
*H04M 1/04* (2006.01)
(Continued)

(52) U.S. Cl.
CPC ............... *H04M 1/0279* (2013.01); *A45F 5/02* (2013.01); *H04B 1/385* (2013.01); *H04B 1/3877* (2013.01); *H04B 1/3888* (2013.01); *H04M 1/04* (2013.01); *A45F 5/021* (2013.01); *A45F 2005/006* (2013.01); *A45F 2005/027* (2013.01); *A45F 2005/028* (2013.01); *A45F 2200/0516* (2013.01); *H04B 2001/3855* (2013.01)

(58) Field of Classification Search
CPC .................... A45F 2005/006; A45F 2005/027; A45F 2005/028; A45F 2200/0516; A45F 5/02; A45F 5/021; H04B 1/385; H04B 1/3877; H04B 1/3888; H04B 2001/3855; H04M 1/0279; H04M 1/04
USPC .................. 455/575.1, 575.6, 128, 90.3, 557, 455/575.8; 224/101, 269, 194, 191, 250; 206/45.24, 37, 320; 248/688, 231.15, 248/682, 231.51; 24/3.12; 381/375, 380, 381/378
See application file for complete search history.

(56) References Cited

U.S. PATENT DOCUMENTS 6,540,193 B1 * 4/2003 DeLine .......................... 248/481
2004/0232180 A1 * 11/2004 Badillo ........................ 224/269
(Continued)

OTHER PUBLICATIONS

Grip-Ez, http://grip-ez.com, last accessed Feb. 13, 2013, 2 pages.
(Continued)

*Primary Examiner* — Tan H Trinh
(74) *Attorney, Agent, or Firm* — Ice Miller LLP (57) ABSTRACT

The disclosure of the present application includes accessories for securing mobile devices. In an exemplary embodiment of an accessory for securing a mobile device of the present disclosure, the accessory includes a socket having a receiver portion opposite an attachment surface, where the attachment surface is capable of attaching to a mobile device, and a connector including a connecting member disposed on a base, where the receiver portion is configured to engage and retain the connecting member. In at least one embodiment, the accessory further includes a sleeve having a tubular wall defining an opening through the sleeve, where the sleeve is adapted to accept and retain a digit of a user and is mechanically connected to the connecting member.

14 Claims, 5 Drawing Sheets

(51) Int. Cl.
*A45F 5/02* (2006.01)
*A45F 5/00* (2006.01)

(56) References Cited

U.S. PATENT DOCUMENTS

| | | | |
|---|---|---|---|
| 2005/0070345 A1* | 3/2005 | Pan | 455/575.1 |
| 2006/0112522 A1* | 6/2006 | Shannon et al. | 24/3.12 |
| 2006/0163295 A1* | 7/2006 | Badillo | 224/269 |
| 2007/0213104 A1* | 9/2007 | Fields | 455/575.6 |
| 2009/0016559 A1* | 1/2009 | Cleary | 381/375 |
| 2011/0096427 A1* | 4/2011 | Uken et al. | 359/872 |
| 2012/0118770 A1* | 5/2012 | Valls et al. | 206/320 |
| 2012/0168482 A1* | 7/2012 | Dugan | 224/567 |
| 2013/0112723 A1* | 5/2013 | Harter et al. | 224/274 |
| 2014/0028243 A1* | 1/2014 | Rayner | 320/103 |
| 2014/0314266 A1* | 10/2014 | Kroupa | 381/384 |

OTHER PUBLICATIONS

Yofo Eero, http://theyofo.wordpress.com/about/, last accessed Feb. 13, 2013, 3 pages.

* cited by examiner

ACCESSORY FOR MOBILE DEVICES

PRIORITY

This application is related to, and claims the priority benefit of, U.S. Provisional Patent Application Ser. No. 61/599,265, filed Feb. 15, 2012, which is hereby incorporated by reference in its entirety into this disclosure.

BACKGROUND

Handheld mobile electronic devices are becoming ubiquitous in modern society and include such devices as mobile phones, electronic readers, tablets, gaming devices, media players, and the like. Though these devices come in various sizes and shapes, each is ostensibly designed to be held in a user's hands. Despite this intended purpose, most mobile devices are not ergonomically designed to fit well in a user's hands. The devices can be awkward to hold and operate and, therefore, can be prone to being dropped. Unfortunately, most mobile devices are not very robust, and a drop from any appreciable height can irreparably damage the device.

Many smaller mobile devices are specifically designed fit in a user's pocket or a belt carrier pouch for easy transportation of the device. The small size that allows for easy transport often makes the device difficult to use for those users with lesser manual dexterity, particularly older users. For these and many additional users, the need to both securely grip the device and keep fingers free to operate the device negatively affects the users' ability to operate the device effectively. As a result, many users will set the device down on a flat surface to operate their device. For these users, having a stable base that presents the device at an appropriate viewing and operating angle is desirable.

To address these issues, there is a need for a mobile device accessory that aids a user in securely and ergonomically holding a mobile device, prevents the device from being dropped while being operated, and enables the device to be secured when being transported.

BRIEF SUMMARY

The disclosure of the present application includes accessories for securing a mobile device. In an exemplary embodiment of an accessory for securing a mobile device of the present disclosure, the accessory includes a socket having a receiver portion opposite an attachment surface, where the attachment surface is capable of attaching to a mobile device, and a connector including a connecting member disposed on a base, where the receiver portion is configured to engage and retain the connecting member. In at least one embodiment, the accessory further includes a sleeve having a tubular wall defining an opening through the sleeve, where the sleeve is adapted to accept and retain a digit of a user and is mechanically connected to the connecting member. The tubular wall includes an aperture formed therethrough, the aperture configured to enable the connecting member of the connector to pass through the tubular wall and to retain the base within the opening of the sleeve.

In at least one embodiment, the connector includes a curved shape substantially similar in curvature to the tubular wall of the sleeve. In at least one embodiment, the connector and the sleeve is a single integral body. In at least one embodiment, the sleeve is a resilient and elastic material. In at least one embodiment, the sleeve is a neoprene material. In at least one embodiment, the base of the connector includes an attachment surface opposite the connecting member, where the attachment surface is configured to reversibly attach to a selected surface. The attachment surface includes an adhesive surface.

In at least one embodiment, the base of the connector further includes a support adjacent the connecting member, where the support is configured to position the mobile device at an ergonomic orientation to a user. In at least one embodiment, the base of the connector further includes an hole formed therethrough and configured to accept a means of attachment. In at least one embodiment, the hole of the base is configured to accept a clasp of a lanyard.

In at least one embodiment, an accessory for securing a mobile device, the device includes a socket having a ball socket portion opposite an attachment surface, where the attachment surface is configured to attach to a mobile device, a connector having a ball disposed on a base, wherein the ball is configured to reversibly engage the ball socket portion of the socket, and a tubular sleeve defining a channel and a wall and having an aperture formed through said wall, where the channel being configured to accept and retain a finger of a user, and where the aperture is configured to enable the ball of the connector to pass through the wall but to prevent the base from passing through the wall. In at least one embodiment, the connector and the sleeve comprise one integral member.

BRIEF DESCRIPTION OF THE DRAWINGS

The described embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

Like reference numerals indicate the same or similar parts throughout the several figures.

An overview of the features, functions and configuration of the components depicted in the various figures will now be presented. It should be appreciated that not all of the features of the components of the figures are necessarily described. Some of these non-discussed features, such as various couplers, etc., as well as discussed features are inherent from the figures. Other non-discussed features may be inherent in component geometry or configuration.

DETAILED DESCRIPTION

The present application discloses accessories for mobile devices and methods for using and constructing the same. According to one aspect of the present disclosure, an accessory that enables secure and stable attachment between a user and a mobile electronic device is disclosed. For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Figure 1:
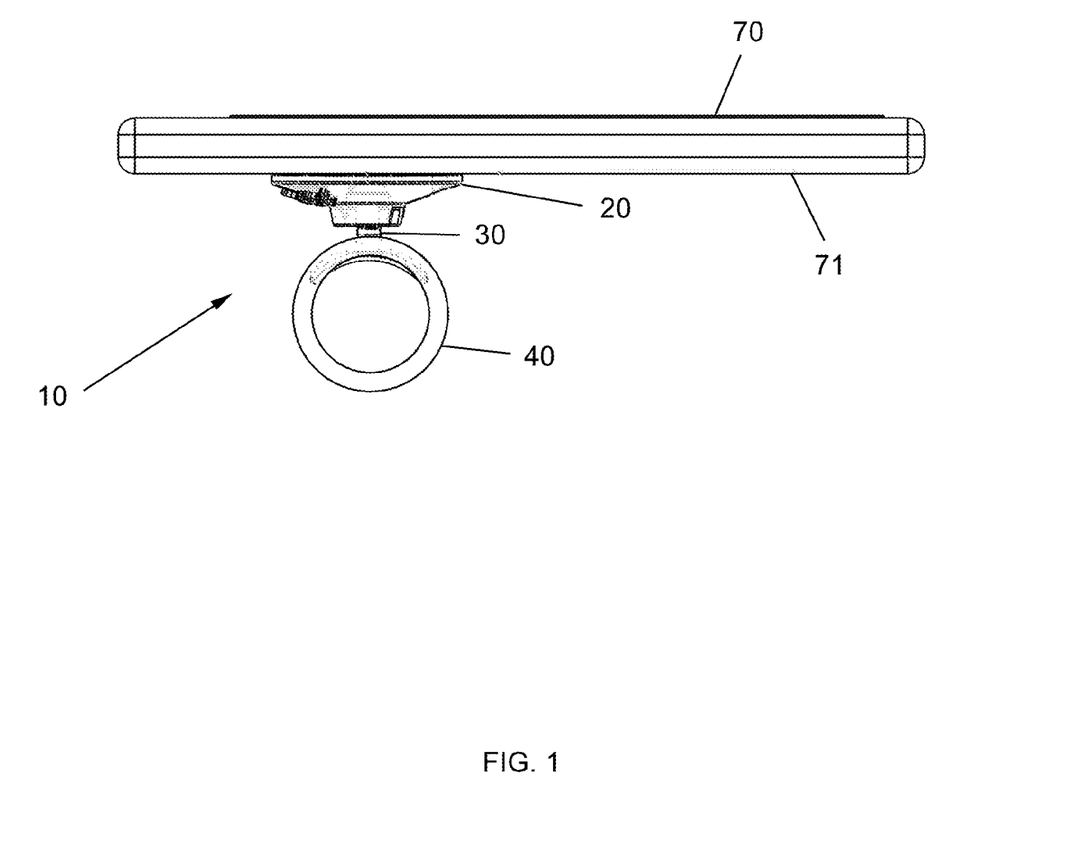
FIG. 1 shows an accessory for mobile devices attached to a mobile device, according to an embodiment of the present disclosure.
Figure 2:
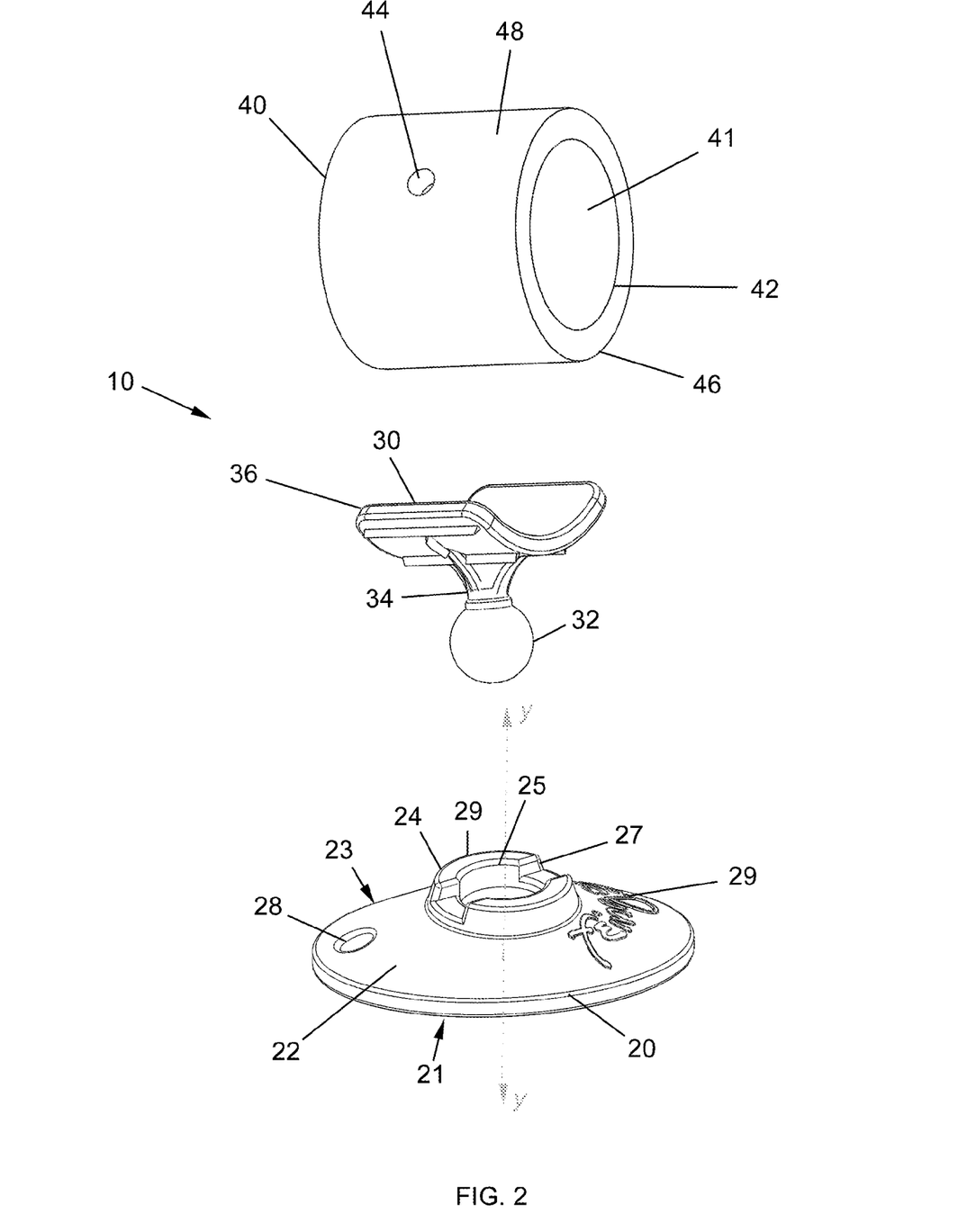
FIG. 2 shows an exploded perspective view of an accessory for mobile devices, according to an embodiment of the present disclosure.

FIG. 1 depicts an accessory 10 for mobile devices attached to a mobile device 70. As shown in FIG. 1, an accessory 10 may include a socket 20 capable of attachment to the device 70, a sleeve 40 capable of attachment to a user, and a connector 30 that connects the socket 20 with the sleeve 40, wherein the accessory 10 provides a secure and stable attachment between a mobile device 70 and a user (not shown). As shown in FIG. 2, the connector 30 may include a ball portion 32, a connector base portion 36, and a stem portion 34 disposed therebetween. In at least one embodiment, the ball 32, stem 34, and connector base 36 may be formed as a single integral body. Alternatively, the ball 32, stem 34, and connector base 36 may be separate elements attached to one another. Moreover, the connector base 36 may be formed with a degree of curvature such that the connector base 36 substantially conforms to the general shape of the sleeve 40.

As shown in FIG. 2, the sleeve 40 may comprise a tubular shape having a cylindrical wall 46 having an inner surface 42 and an opposing outer surface 48, wherein the wall 46 defines a sleeve opening 41 through the length of the sleeve 40. The sleeve opening 41 is shaped such that a user's finger (not depicted), or other similarly shaped object, can pass through the sleeve opening 41 in a manner that enables the sleeve 40 to fit around and retain the finger. For illustration, the diameter of the sleeve opening 41 may be 15 millimeters (mm), the thickness of the wall 46 may be 3.0 mm, and the length of the sleeve 40 may be 38 mm. The sleeve 40 may further include an aperture 44 formed through the wall 46.

Referring to FIGS. 1 and 2, the sleeve 40 may be configured to engage the connector 30. The connector 30 may be disposed partially within the sleeve 40 such that the stem 34 is disposed at least partially within the wall 46 and the connector base 36 is disposed at least partially within the sleeve opening 41. Accordingly, the aperture 44 may be formed to enable the ball 32 to pass from within the sleeve opening 41, through wall 46, and then through the outer surface 48, but further formed to prevent the connector base 36 from passing through the wall 46. Alternatively, instead of being separate pieces, the connector 30 and the sleeve 40 may be formed as a single integral body, which may include the sleeve portion 40, the stem portion 34, and the ball portion 32.

Referring to FIG. 2, the socket 20 may include a socket base portion 22 and a ball socket portion 24 disposed on a top surface 23 of the socket base 22. The ball socket portion 24 may be defined by a socket wall 29 having a spherically shaped inner socket surface 25 with at least one notch 27 at least partially interrupting socket wall 29. The ball socket 24 is capable of reversibly engaging the ball 32 of the connector 30, whereby the spherical diameter defined by the inner socket surface 25 is selected to substantially engage the ball 32 with sufficient force to support the weight of the device 70. For illustration, the diameter of the ball 32 may be 8.0 millimeters (mm), and the diameter defined by the inner socket surface 25 may be 7.8 mm. The ball socket 24 may be further configured to enable rotation of the ball 32 within the ball socket 24, wherein the connector 30 may rotate 360 degrees and may tilt at least partially relative to the socket 20 and about the y-y axis as depicted FIG. 2. The at least one notch 27 may be formed to enable the socket wall 29 to reversibly deflect, thereby enabling the ball 32 to be inserted into the ball socket 24 and, once inserted, to be retained therein until sufficient force, significantly exceeding the weight of the device 70, is applied to disengage the ball 32 from the ball socket 24. Alternatively, the ball socket 24 may be formed of a suitably flexible and resilient material such that the socket wall 29 may be formed without the at least one notch 27 and yet function to deflect and engage the ball 32 as described herein. Further, the ball 32 need not be spherically shaped and may be any shape that enables rotation and tilt about the axis y-y. Where the ball 32 is other than spherically shaped, the mating socket wall 29 may comprise any correspondingly suitably shaped mating inner socket surface 25.

The socket 20 may further include an attachment surface 21 disposed opposite the top surface 23. The attachment surface 21 may include any number of different means for attaching socket 20 to device 70. By way of non-limiting example, the attachment surface 21 may include a layer of adhesive suitable to permanently or reversibly attach the socket 20, preferably, to a non-functional area of a mobile device 70, such as a back cover 71 as shown in FIG. 1. Said adhesive layer may comprise any number of known adhesives, including but not limited to, an automotive grade, double-sided, foam tape. The socket 20 may further include indicia 29, such as a trademark or other identifiers, imprinted or formed on the top surface 23 or any visible surface. In at least one embodiment, the socket 20 may further include a hole 28 formed through the base 22. The hole 28 may be formed to accept the loop of a key ring, the clasp of a lanyard, or other suitable means of attachment. The hole 28 enables a user to retain the accessory 10 when the socket 20 is not attached to a device 70.

The connector 30 may be formed of a strong and durable material such as a suitable polymer or metal. The socket 20 may be formed of a strong, durable, and elastically deformable material that is compatible with the material selected for the connector 30, such as a suitable polymer or a metal. Where a polymer is used, the connector 30 and socket 20 may be injection molded. The sleeve 40 may be formed of an elastically deformable material, such as neoprene, suitable to enable the sleeve 40 to conform to and comfortably grip the finger of a user. The inner surface 42 or outer surface 48 of the sleeve 40 may further be laminated or covered with nylon, or other suitable material, to provide durability and wear resistance to the sleeve 40 for extended use.

In operation, the attachment surface 21 of the socket 20 may be affixed to a mobile device 70. The connector 30 may be installed in the sleeve 40 as described herein. Moreover, the ball 32 of the connector 30 may be pushed into and retained by the ball socket 24. Subsequently, the sleeve 40 may be placed on a finger of a user's hand by inserting the finger thru the opening 41. In this configuration, the accessory 10 is capable of substantially retaining the device 70 within the grasp of a user. Further, the device 70 may be rotated 360 degrees and titled within the grasp of the user to facilitate the operation of device in either landscape or portrait mode or in some orientation in between.

Figure 3:
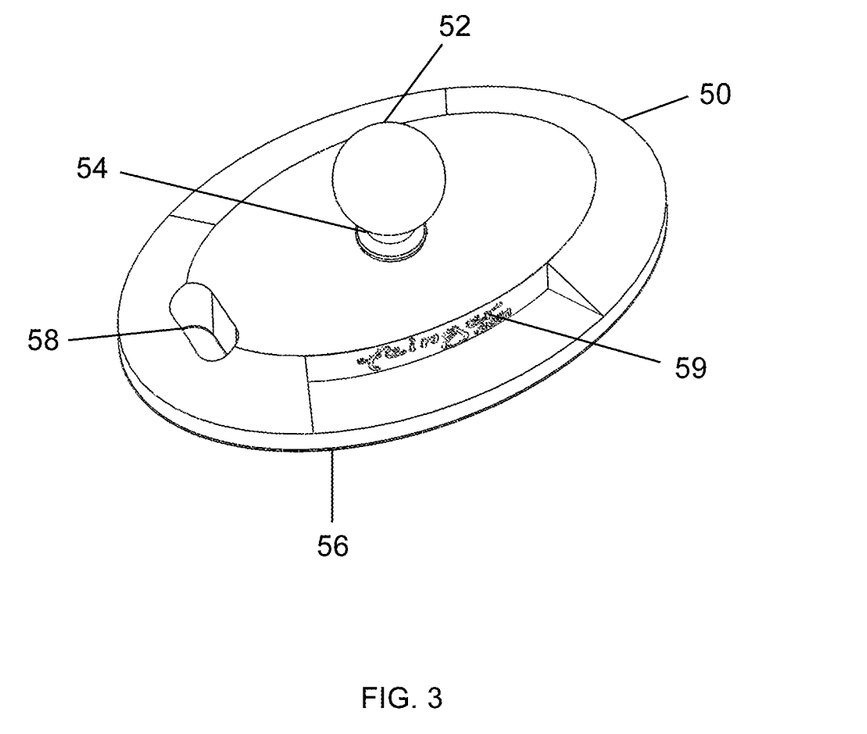
FIG. 3 shows a connector for an accessory for mobile devices, according to an embodiment of the present disclosure.

The connector 30 may include various different configurations. For example, in at least one embodiment according to the present disclosure as shown in FIG. 3, a connector 50 may include a connector base 56 with a stem 54 attached to or integral with a ball 52 disposed thereon. The connector 50 may further include a hole 58 formed therethrough. Connector 50 may be attached to the socket 20 and the mobile device 70 using similar means as connector 30 with the ball 52 engaging the ball socket 24. However, instead of engaging the sleeve 40, the connector 50 with the hole 58 enables an alternative connection between the accessory 10 and a user. To enable connection to a user, the hole 58 may be formed to enable a hook, clip, clasp, pin, string, or other suitable means of attachment (not shown) to engage with the connector 50, whereby the selected means of attachment is further attached to the user. Accordingly, the selected means of attachment may be further attached to the user by any suitable means, including but not limited to, a lanyard worn around the users' neck, a clip to the user's clothing (e.g., pants, belt, shirt pocket, purse, or coat), or a conventional key ring.

Figure 4:
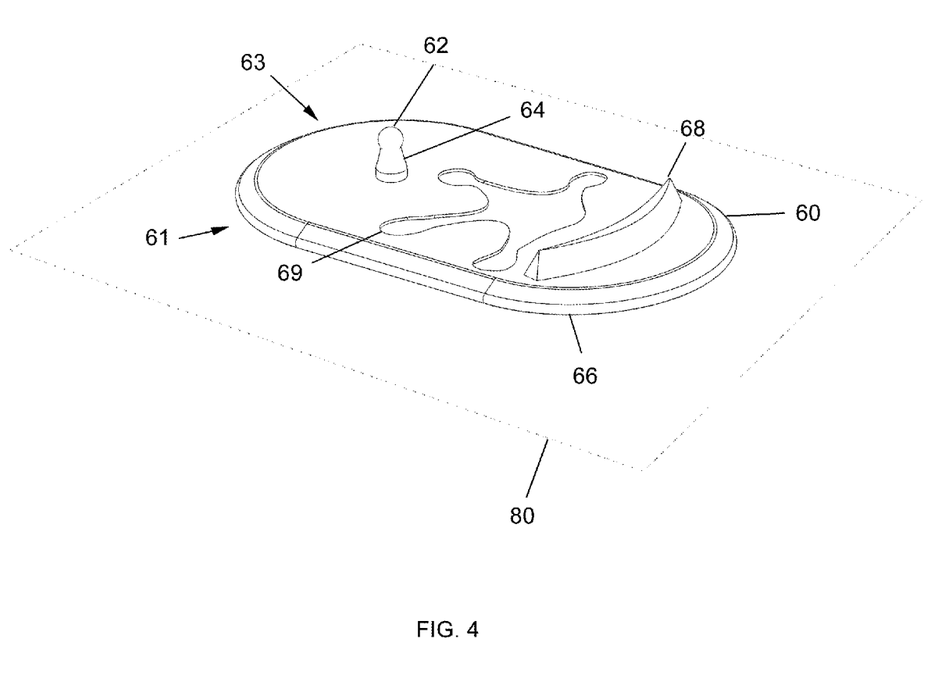
FIG. 4 shows an alternative connector for an accessory for mobile devices, according to an embodiment of the present disclosure.
Figure 5:
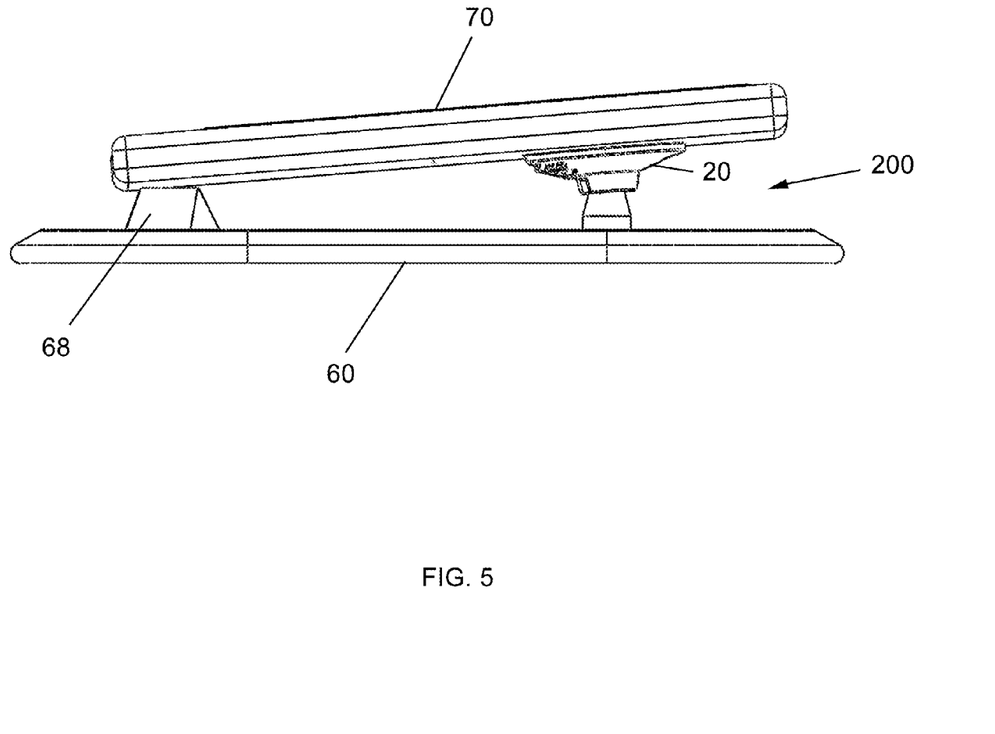
FIG. 5 shows a connector for an accessory for mobile devices attached to a mobile device, according to an embodiment of the present disclosure.

In at least one embodiment according to the present disclosure as shown in FIG. 4, a connector 60 may include a connector base 66 having a top surface 63. The connector 60 may further include a support 68 disposed upon the top surface 63 and adjacent a stem 64 also disposed upon the top surface 63 and connected to a ball 62. Connector 60 may be attached to socket 20 and device 70 using similar means as connector 30, whereby ball 62 engages the ball socket 24. The support 68 may be adapted to position the device 70 at a suitable orientation for ergonomic viewing and operation of the device as shown in FIG. 5. In at least one embodiment, instead of a sleeve 40, connector 60 may be attached to the secure and stable connector base 66, which may be placed on a working surface 80, such as a table, desk, or car dashboard. Thus, the device 70 may rest on the support 68 to position and orient the device 70 for easy use, while the socket 20 and connector 60 ensure that the base 66 and the device 70 are securely connected.

Further, the connector 60 may include an attachment surface 61 disposed opposite the top surface 63 and adapted to attach the connector 60 to the working surface 80. For example, the attachment surface 61 may include a layer of adhesive suitable to permanently or reversibly attach the connector 60 to the working surface 80. Said adhesive layer may comprise any number of known adhesives, including but not limited to, an automotive grade, double-sided, foam tape. Further, the connector 60 may include indicia 69 imprinted or formed on the top surface 63 or any visible surface, such as a trademark or other identifiers.

As should be apparent from the foregoing examples, the socket 20 enables many different uses of an accessory 10 for mobile devices as disclosed herein. Specifically, the socket 20 is capable of attaching to many different connector configurations, including those shown in FIGS. 2-4. As a result, socket 20 enables a user to switch from holding a device 70 in a secure manner in his/her hand (i.e., using connector 30 and sleeve 40 shown in FIG. 2), to attaching the device 70 to a user's belt or a lanyard (not shown) for easy transportation (i.e., using connector 50 shown in FIG. 3), to securing the device 70 to a stable platform for placement on a desk or for attachment to a wall or vehicle dashboard among others (i.e., using connector 60 as shown in FIG. 4). Further, socket 20 enables a device 70 to rotate a full 360 degrees and to tilt about the axis y-y (as shown in FIG. 2), regardless of which connector element is attached to the socket 20.

While various embodiments of an accessory for mobile devices and methods for using the same have been described in considerable detail herein, the embodiments are merely offered by way of non-limiting examples of the disclosure described herein. It will therefore be understood that various changes and modifications may be made, and equivalents may be substituted for elements thereof, without departing from the scope of the disclosure and are intended to encompass any later appended claims. Indeed, this disclosure is not intended to be exhaustive or to limit the scope of the disclosure.

Further, in describing representative embodiments, the disclosure may have presented a method and/or process as a particular sequence of steps. However, to the extent that the method or process does not rely on the particular order of steps set forth herein, the method or process should not be limited to the particular sequence of steps described. Other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

The invention claimed is:

1. A device for securing a mobile device, the device comprising:
   a socket having a ball socket portion opposite an attachment surface, wherein the attachment surface is capable of attaching to a mobile device;
   a connector comprising a ball disposed on a base, wherein the ball socket portion is configured to engage and retain the ball; and
   a sleeve having a tubular wall defining an opening through the sleeve, wherein the sleeve is adapted to accept and retain a digit of a user, and wherein the sleeve is mechanically connected to the ball.

2. The device of claim 1, wherein the tubular wall comprises an aperture formed therethrough, the aperture configured to enable the ball of the connector to pass through the tubular wall and to retain the base within the opening of the sleeve.

3. The device of claim 1, wherein the base of the connector comprises a curved shape substantially similar in curvature to the tubular wall of the sleeve.

4. The device of claim 1, wherein the connector and the sleeve comprise a single integral body.

5. The device of claim 1, wherein the sleeve comprises a resilient and elastic material.

6. The device of claim 5, wherein the sleeve comprises a neoprene material.

7. An device for securing a mobile device, the device comprising:
   a socket having a ball socket portion opposite an attachment surface, wherein the attachment surface is configured to attach to a mobile device;
   a connector having a ball disposed on a base, wherein the ball is configured to reversibly engage the ball socket portion of the socket; and
   a tubular sleeve defining a channel and a wall and having an aperture formed through said wall, the channel being configured to accept and retain a finger of a user, wherein the aperture is configured to enable the ball of the connector to pass through the wall but to prevent the base from passing through the wall.

8. The device of claim 7, wherein the connector and the sleeve comprise one integral member.

9. A device for securing a mobile device, the device comprising:
   a socket having a receiver portion opposite an attachment surface, wherein the attachment surface is capable of attaching to a mobile device;
   a connector comprising a connecting member disposed on a base, wherein the receiver portion is configured to engage and retain the connecting member; and
   a sleeve having a tubular wall defining an opening through the sleeve, wherein the sleeve is adapted to accept and retain a digit of a user, and wherein the sleeve is mechanically connected to the connecting member.

10. The device of claim 9, wherein the tubular wall comprises an aperture formed therethrough, the aperture configured to enable the connecting member of the connector to pass through the tubular wall and to retain the base within the opening of the sleeve.

11. The device of claim 9, wherein the base of the connector comprises a curved shape substantially similar in curvature to the tubular wall of the sleeve.

12. The device of claim 9, wherein the connector and the sleeve comprise a single integral body.

13. The device of claim 9, wherein the sleeve comprises a resilient and elastic material.

14. The device of claim 13, wherein the sleeve comprises a neoprene material.

\* \* \* \* \*